US008175297B1

(12) United States Patent
Ho et al.

(10) Patent No.: US 8,175,297 B1

(45) Date of Patent: May 8, 2012

(54) AD HOC SENSOR ARRAYS

(75) Inventors: Harvey Ho, Mountain View, CA (US); Adrian Wong, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/177,333

(22) Filed: Jul. 6, 2011

(51) Int. Cl.

| | |
|---|---|
| ***H04R 3/00*** | (2006.01) |
| ***H04R 27/00*** | (2006.01) |
| ***H04R 5/02*** | (2006.01) |
| ***H04B 3/00*** | (2006.01) |
| ***H04B 7/00*** | (2006.01) |

(52) U.S. Cl. ............ 381/122; 381/92; 381/111; 381/77; 381/82; 381/311; 455/41.2; 455/41.3; 455/66.1

(58) Field of Classification Search .................. 381/122, 381/92, 111, 77, 82, 311, 56, 58, 59, 74; 455/41.2, 41.3, 66.1
See application file for complete search history.

(56) References Cited

U.S. PATENT DOCUMENTS

| | | | | |
|---|---|---|---|---|
| 7,124,425 | B1 | 10/2006 | Anderson, Jr. et al. | |
| 7,327,852 | B2 | 2/2008 | Ruwisch | |
| 7,587,053 | B1 | 9/2009 | Pereira | |
| 7,924,655 | B2 * | 4/2011 | Liu et al. | 367/124 |
| 2006/0239471 | A1 | 10/2006 | Mao et al. | |
| 2008/0247567 | A1 | 10/2008 | Kjolerbakken et al. | |
| 2010/0069035 | A1 | 3/2010 | Johnson | |
| 2010/0119072 | A1 * | 5/2010 | Ojanpera | 381/17 |
| 2010/0254543 | A1 | 10/2010 | Kjolerbakken et al. | |
| 2011/0002469 | A1 * | 1/2011 | Ojala | 381/22 |
| 2011/0082390 | A1 | 4/2011 | Krieter et al. | |
| 2011/0082690 | A1 | 4/2011 | Togami et al. | |

FOREIGN PATENT DOCUMENTS

| | | |
|---|---|---|
| WO | 2010149823 | 12/2010 |

OTHER PUBLICATIONS

Oriol Vinyals et al., "Multimodal Indoor Localization: An Audio-Wireless-Based Approach," 2010 IEEE Fourth International Conference on Semantic Computing (Sep. 22, 2010.) pp. 120-125.

(Continued)

*Primary Examiner* — Devona Faulk
(74) *Attorney, Agent, or Firm* — McDonnell Boehnen Hulbert & Berghoff LLP

(57) ABSTRACT

Systems and methods for estimating audio at a requested location are presented. In one embodiment, the method includes receiving from a client device a request for audio at a requested location. The method further includes determining a location of a plurality of audio sensors, where the plurality of audio sensors are coupled to head-mounted devices in which a location of each of the plurality of audio sensors varies. The method further includes, based on the requested location and the location of the plurality of audio sensors, determining an ad hoc array of audio sensors, receiving audio sensed from audio sensors in the ad hoc array, and processing the audio sensed from audio sensors in the ad hoc array to produce an output substantially estimating audio at the requested location.

20 Claims, 9 Drawing Sheets

OTHER PUBLICATIONS

Murat Demirbas et al., "Crowd-Sourced Sensing and Collaboration Using Twitter," 2010 IEEE International Symposium on a World of Wireless, Mobile, and Multimedia Networks (Jun. 14, 2010.) pp. 1-9.

Tingxin Yan et al., "mCrowd—A Platform for Mobile Crowdsourcing," Proceedings of the 7th ACM Conference on Embedded Networked Sensor Systems (Nov. 4, 2009.) pp. 347-348.

Emiliano Miluzzo et al., "CenceMe—Injecting Sensing Presence into Social Networking Applications," EuroSSC 2007 (Oct. 23-25, 2007) pp. 1-28.

Charu C. Aggarwal et al., "Integrating Sensors and Social Networks," Social Network Data Analytics, Chapter 14 (Mar. 2011.) pp. 379-412.

Wang et al., "Target Classification and Localization in Habitat Monitoring," Proceedings of the 2003 IEEE International Conference on Acoustics, Speech, and Signal Processing (Apr. 2003.) Retrieved from the Internet on Apr. 28, 2011. (http://citeseerx.ist.psu.edu/viewdoc/download?doi=10.1.1.82.1027&rep=rep1&type=pdf).

* cited by examiner

500

502

| DeviceID | |
|---|---|
| SensedAudio1 | 30.4296, -97.7864 |
| SensedAudio2 | 30.4296, -97.7864 |
| SensedAudio3 | 30.4296, -97.7864 |
| SensedAudio4 | 30.4296, -97.7864 |

504 506

FIG. 5a

508

| DeviceID | | |
|---|---|---|
| SensedAudio1 | 30.4296, -97.7864 | May 23, 2011, 13:24:35 |
| SensedAudio2 | 30.4296, -97.7864 | May 23, 2011, 13:24:36 |
| SensedAudio3 | 30.4296, -97.7864 | May 23, 2011, 13:24:37 |
| SensedAudio4 | 30.4296, -97.7864 | May 23, 2011, 13:24:38 |

510

FIG. 5b

AD HOC SENSOR ARRAYS

BACKGROUND

Audio sensors, such as microphones, can allow audio produced in an environment to be recorded and heard by persons remote from the area. As one example, audio sensors may be placed around a concert venue to record a musical performance. A person not present at the concert venue may, by listening to the audio recorded by the audio sensors placed around the concert venue, hear the audio produced during the musical performance. As another example, audio sensors may be placed around a stadium to record a professional sporting event. A person not present at the stadium may, by listening to the audio recorded by the audio sensors placed around the stadium, hear the audio produced during the sporting event. Other examples are possible as well.

Typically, however, the location of audio sensors within an environment is either predefined before use of the audio sensors or manually controlled by one or more operators while the audio sensors are in use. A person remote from the environment typically cannot control or request a location of the audio sensors within the environment. Further, in some cases, the density of audio sensors may be not great enough to record audio at desired locations in an environment.

SUMMARY

Methods and systems for estimating audio at a requested location are described. In one example, a plurality of audio sensors at a plurality of locations sense audio. An ad hoc array of audio sensors in the plurality of sensors is generated that includes, for example, audio sensors that are closest to the requested location. Audio recorded by the audio sensors in the ad hoc array is processed to produce an estimation of audio at the requested location.

In an embodiment, a method may include receiving from a client device a request for audio at a requested location. The method may further include determining a location of a plurality of audio sensors, where the plurality of audio sensors are coupled to head-mounted devices in which a location of each of the plurality of audio sensors varies. The method may further include, based on the requested location and the plurality of audio sensors, determining an ad hoc array of audio sensors. Determining the ad hoc array may involve selecting from a plurality of predefined environments a predefined environment in which the requested location is located and identifying audio sensors in the plurality of audio sensors that are currently associated with the selected predefined environment. Determining the ad hoc array may further involve determining a separation distance of the audio sensors currently associated with the selected predefined environment (where the separation distance for an audio sensor comprises a distance between the location of the audio sensor and the requested location) and selecting for the ad hoc array audio sensors having a separation distance below a predetermined threshold. The method may further include receiving audio sensed from audio sensors in the ad hoc array and processing the audio sensed from audio sensors in the ad hoc array to produce an output substantially estimating audio at the requested location.

In another embodiment, a non-transitory computer readable medium is provided having stored thereon instructions executable by a computing device to cause the computing device to perform the functions of the method described above.

In yet another embodiment, a server is provided that includes a first input interface configured to receive from a client device a request for audio at a requested location, a second input interface configured to receive audio from audio sensors, at least one processor, and data storage comprising selection logic and processing logic. The selection logic may be executable by the at least one processor to determine a location of a plurality of audio sensors, where the plurality of audio sensors are coupled to head-mounted devices in which a location of each of the plurality of audio sensors varies. The selection logic may be further executable by the processor to, based on the requested location and the locations of the plurality of audio sensors, determine an ad hoc array of audio sensors. Determining the ad hoc array may involve selecting from a plurality of predefined environments a predefined environment in which the requested location is located and identifying audio sensors in the plurality of audio sensors that are currently associated with the selected predefined environment. Determining the ad hoc array may further involve determining a separation distance of the audio sensors currently associated with the selected predefined environment (where the separation distance for an audio sensor comprises a distance between the location of the audio sensor and the requested location) and selecting for the ad hoc array audio sensors having a separation distance below a predetermined threshold. The processing logic may be executable by the processor to process the audio sensed from audio sensors in the ad hoc array to produce an output substantially estimating audio at the requested location.

Other embodiments are described below. The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIGS. 5*a-b* show example location-based (FIG. 5*a*) and location-and-time-based (FIG. 5*b*) records of audio recorded at an audio sensor, in accordance with an embodiment.

DETAILED DESCRIPTION

The following detailed description describes various features and functions of the disclosed systems and methods with reference to the accompanying figures. In the figures, similar symbols typically identify similar components, unless context dictates otherwise. The illustrative system and method embodiments described herein are not meant to be limiting. It will be readily understood that certain aspects of the disclosed systems and methods can be arranged and combined in a wide variety of different configurations, all of which are contemplated herein.

1. Example System

Figure 1:
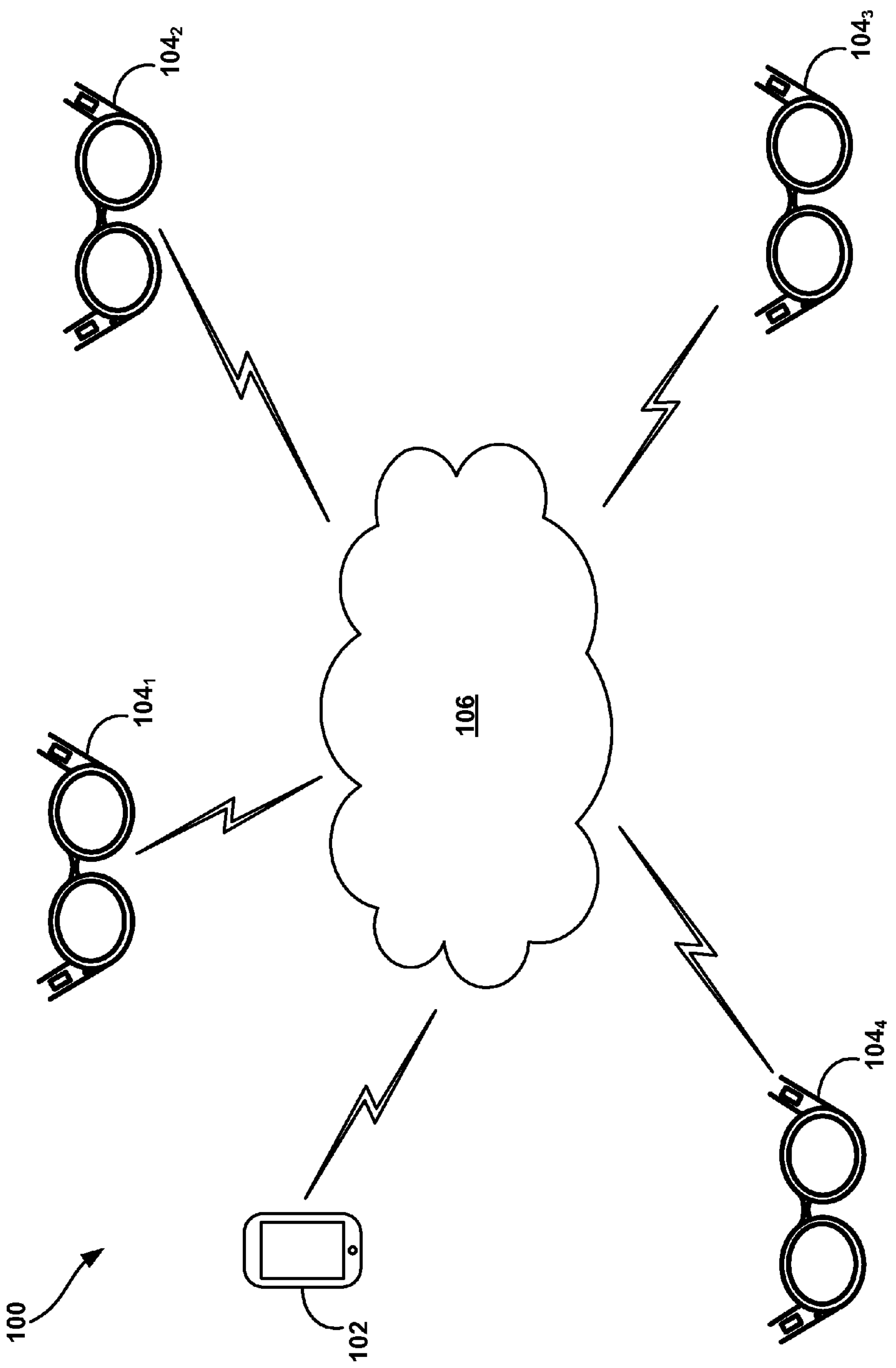
FIG. 1 shows an overview of an embodiment of an example system.

FIG. 1 shows an overview of an embodiment of an example system 100. As shown, the example system 100 includes a client device 102 that is wirelessly coupled to a server 106. Further, the example system 100 includes a plurality of head-mounted devices 104, each of which is also wirelessly coupled to the server 106. Each of the client device 102 and the head-mounted devices 104 may be wirelessly coupled to the server 106 via one or more packet-switched networks (not shown). While one client device 102 and four head-mounted devices 104 and are shown, more or fewer client devices 102 and/or head-mounted devices 104 are possible as well.

While FIG. 1 illustrates the client device 102 as a smartphone, other types of client devices 102 could additionally or alternatively be used. For example, the client device 102 may be a tablet computer, a laptop computer, a desktop computer, head-mounted or otherwise wearable computer, or any other device configured to wirelessly couple to the server 106. Similarly, while head-mounted devices 104 are shown as pairs of eyeglasses, other types of head-mounted devices 104 could additionally or alternatively be used. For example, the head-mounted devices 104 may include one or more of visors, headphones, hats, headbands, earpieces or any other type of headwear configured to wirelessly couple to the server 106. In some embodiments, the head-mounted devices 104 may in fact be other types of wearable or hand-held computers.

The client device 102 may be configured to transmit to the server 106 a request for audio at a particular location. Further, the client device 102 may be configured to receive from the server 106 an output substantially estimating audio at the requested location. An example client device 102 is further described below in connection with FIG. 2.

Each head-mounted device 104 may be configured to be worn by a user. Accordingly, each head-mounted device 104 may be moveable, such that a location of each head-mounted device 104 varies. Further, each head-mounted device 104 may include at least one audio sensor configured to sense audio in an area surrounding the head-mounted device 104. Further, each head-mounted device 104 may be configured to transmit to the server 106 data representing the audio sensed by the audio sensor on the head-mounted device 104. In some embodiments, the head-mounted devices 104 may continuously transmit data representing sensed audio to the server 106. In other embodiments, the head-mounted devices 104 may periodically transmit data representing the audio to the server 106. In still other embodiments, the head-mounted devices 104 may transmit data representing the audio to the server 106 in response to receipt of a request from the server 106. The head-mounted devices 104 may transmit data representing the audio in other manners as well. An example head-mounted device 104 is further described below in connection with FIG. 3.

The server 106 may be, for example, a computer or a plurality of computers on which one or more programs and/or applications are executed in order to provide one or more wireless and/or web-based interfaces that are accessible by the client device 102 and the head-mounted devices 104 via one or more packet-switched networks.

The server 106 may be configured to receive from the client device 102 the request for audio at a requested location. Further, the server 106 may be configured to determine a location of the head-mounted devices 104 by, for example, querying each head-mounted device 104 for a location of the head-mounted device, receiving from each head-mounted device 104 data indicating a location of the head-mounted device, and/or querying another entity for a location of each head-mounted device 104. The server 106 may determine the location of the head-mounted devices 104 in other manners as well.

The server 106 may be further configured to receive the data representing audio from each of the head-mounted devices 104. In some embodiments, the server 106 may store the received data representing audio and the locations of the head-mounted devices 104 in data storage either at or accessible by the server 106. In particular, the server 106 may associate the data representing audio received from each head-mounted device 104 with the determined location of the head-mounted device 104, thereby creating a location-based record of the audio recorded by the head-mounted devices 104. The server 106 may be further configured to determine an ad hoc array of head-mounted devices 104. The ad hoc array may include head-mounted devices 104 that are located within a predetermined distance of the requested location. The ad hoc array may be a substantially real-time array, in so far as the ad hoc array may, in some embodiments, be determined at substantially the time the server 106 receives the requested location from the client device 102. The server 106 may be further configured to process the data representing audio received from the head-mounted devices 104 in the ad hoc array to produce an output estimating audio at the requested location. The server 106 may be further configured to transmit the output to the client device 102. An example server 106 is further described below in connection with FIG. 4.

2. Example Client Device

Figure 2:
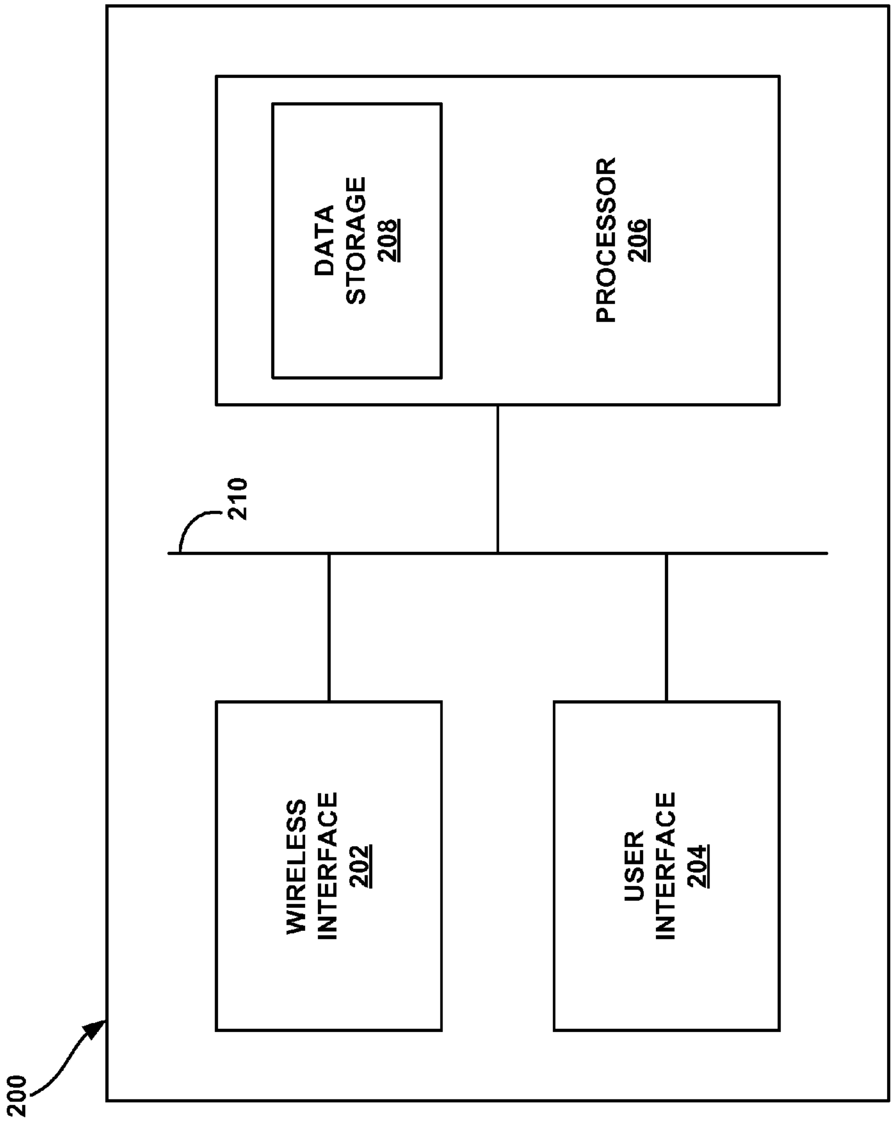
FIG. 2 shows a block diagram of an example client device, in accordance with an embodiment.

FIG. 2 shows a block diagram of an example client device, in accordance with an embodiment. As shown, the client device 200 includes a wireless interface 202, a user interface 204, a processor 206, and data storage 208, all of which may be communicatively linked together by a system bus, network, and/or other connection mechanism 210.

The wireless interface 202 may be any interface configured to wirelessly communicate with a server. The wireless interface 202 may include an antenna and a chipset for communicating with the server over an air interface. The chipset or wireless interface 202 in general may be arranged to communicate according to one or more other types of wireless communication (e.g. protocols) such as Bluetooth, communication protocols described in IEEE 802.11 (including any IEEE 802.11 revisions), cellular technology (such as GSM, CDMA, UMTS, EV-DO, WiMAX, or LTE), or Zigbee, among other possibilities. In some embodiments, the wireless interface 202 may also be configured to wirelessly communicate with one or more other entities.

The user interface 204 may include one or more components for receiving input from a user of the client device 200, as well as one or more components for providing output to a user of the client device 200. The user interface 204 may include buttons, a touchscreen, a microphone, and/or any other elements for receiving inputs, as well as a speaker, one or more displays, and/or any other elements for communicating outputs. Further, the user interface 204 may include analog/digital conversion circuitry to facilitate conversion between analog user input/output and digital signals on which the client device 200 can operate.

The processor 206 may comprise one or more general-purpose processors (such as INTEL® processors or the like) and/or one or more special-purpose processors (such as digital-signal processors or application-specific integrated circuits). To the extent the processor 206 includes more than one processor, such processors may work separately or in combination. Further, the processor 206 may be integrated in whole or in part with the with the wireless interface 202, the user interface 204, and/or with other components.

Data storage 208, in turn, may comprise one or more volatile and/or one or more non-volatile storage components, such as optical, magnetic, and/or organic storage, and data storage 208 may be integrated in whole or in part with the processor 206. In an embodiment, data storage 208 may contain program logic executable by the processor 206 to carry out various client device functions. For example, data storage 208 may contain program logic executable by the processor 206 to transmit to the server a request for audio at a requested location. As another example, data storage 208 may contain program logic executable by the processor 206 to display a graphical user interface through which to receive from a user of the client device 200 an indication of the requested location. Other examples are possible as well.

The client device 200 may include one or more elements in addition to or instead of those shown.

3. Example Head-Mounted Device

Figure 3:
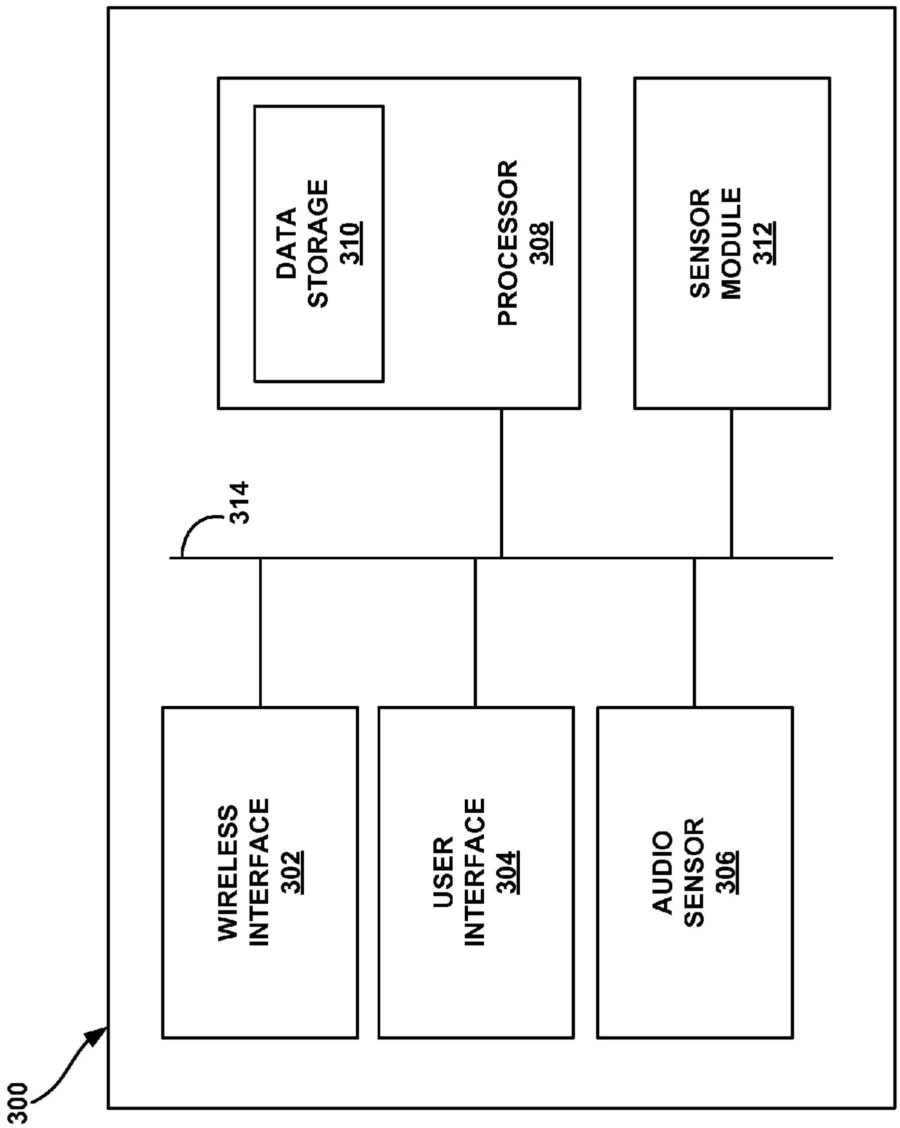
FIG. 3 shows a block diagram of an example head-mounted device, in accordance with an embodiment.

FIG. 3 shows a block diagram of an example head-mounted device 300, in accordance with an embodiment. As shown, the head-mounted device 300 includes a wireless interface 302, a user interface 304, an audio sensor 306, a processor 308, data storage 310, and a sensor module 312, all of which may be communicatively linked together by a system bus, network, and/or other connection mechanism 314.

The wireless interface 302 may be any interface configured to wirelessly communicate with the server. The wireless interface 302 may include an antenna and a chipset for communicating with the server over an air interface. The chipset or wireless interface 302 in general may be arranged to communicate according to one or more other types of wireless communication (e.g. protocols) such as Bluetooth, communication protocols described in IEEE 802.11 (including any IEEE 802.11 revisions), cellular technology (such as GSM, CDMA, UMTS, EV-DO, WiMAX, or LTE), or Zigbee, among other possibilities. In some embodiments, the wireless interface 208 may also be configured to wirelessly communicate with one or more other devices, such as other head-mounted devices.

The user interface 304 may include one or more components for receiving input from a user of the head-mounted device 300, as well as one or more components for providing output to a user of the head-mounted device 300. The user interface 304 may include buttons, a touchscreen, proximity sensor and/or any other elements for receiving inputs, as well as a speaker, one or more displays, and/or any other elements for communicating outputs. Further, the user interface 304 may include analog/digital conversion circuitry to facilitate conversion between analog user input/output and digital signals on which the head-mounted device 300 can operate.

The audio sensor 306 may be any sensor configured to sense audio. For example, the audio sensor 306 may be a microphone or other sound transducer. In some embodiments, the audio sensor 306 may be a directional audio sensor. Further, in some embodiments, the direction of the directional audio sensor may be controllable according to instructions received, for example, from the user of the head-mounted device 300 via the user interface 304, or from the server. In some embodiments, the audio sensor 306 may include two or more audio sensors.

The processor 308 may comprise one or more general-purpose processors and/or one or more special-purpose processors. In particular, the processor 308 may include at least one digital signal processor configured to generate data representing audio sensed by the audio sensor 306. To the extent the processor 308 includes more than one processor, such processors could work separately or in combination. Further, the processor 308 may be integrated in whole or in part with the wireless interface 302, the user interface 304, and/or with other components.

Data storage 310, in turn, may comprise one or more volatile and/or one or more non-volatile storage components, such as optical, magnetic, and/or organic storage, and data storage 310 may be integrated in whole or in part with the processor 308. In an embodiment, data storage 310 may contain program logic executable by the processor 308 to carry out various head-mounted device functions. For example, data storage 310 may contain program logic executable by the processor 308 to transmit to the server the data representing audio sensed by the audio sensor 306. As another example, data storage 310 may, in some embodiments, contain program logic executable by the processor 308 to determine a location of the head-mounted device 300 and to transmit to the server data representing the determined location. As still another example, data storage 310 may, in some embodiments, contain program logic executable by the processor 308 to transmit to the server data representing one or more parameters of the head-mounted device 300 (e.g., one or more permissions currently set for the head-mounted device 300 and/or an environment with which the head-mounted device 300 is currently associated) and/or audio sensor 306 (e.g., an indication of the particular hardware used in the audio sensor 306 and/or a frequency response curve of the audio sensor 306). Other examples are possible as well.

Sensor module 312 may include one or more sensors and/or tracking devices configured to sense one or more types of information. Example sensors include video cameras, still cameras, Global Positioning System (GPS) receivers, infrared sensors, optical sensors, biosensors, Radio Frequency identification (RFID) systems, wireless sensors, pressure sensors, temperature sensors, magnetometers, accelerometers, gyroscopes, and/or compasses, among others. Information sensed by one or more of the sensors may be used by the head-mounted device 300 in, for example, determining the location of the head-mounted device. Further, information sensed by one or more of the sensors may be provided to the server and used by the server in, for example, processing the audio sensed at the head-mounted device 300. Other examples are possible as well. Depending on the sensors included in the sensor module 312, data storage 310 may further include program logic executable by the processor(s) to control and/or communicate with the sensors, and/or transmit to the server data representing information sensed by one or more sensors.

The head-mounted device 300 may include one or more elements in addition to or instead of those shown. For example, the head-mounted device 300 may include one or more additional interfaces and/or one or more power supplies. Other additional components are possible as well. In these embodiments, the data storage 310 may further include program logic executable by the processor(s) to control and/or communicate with the additional components.

4. Example Server

Figure 4:
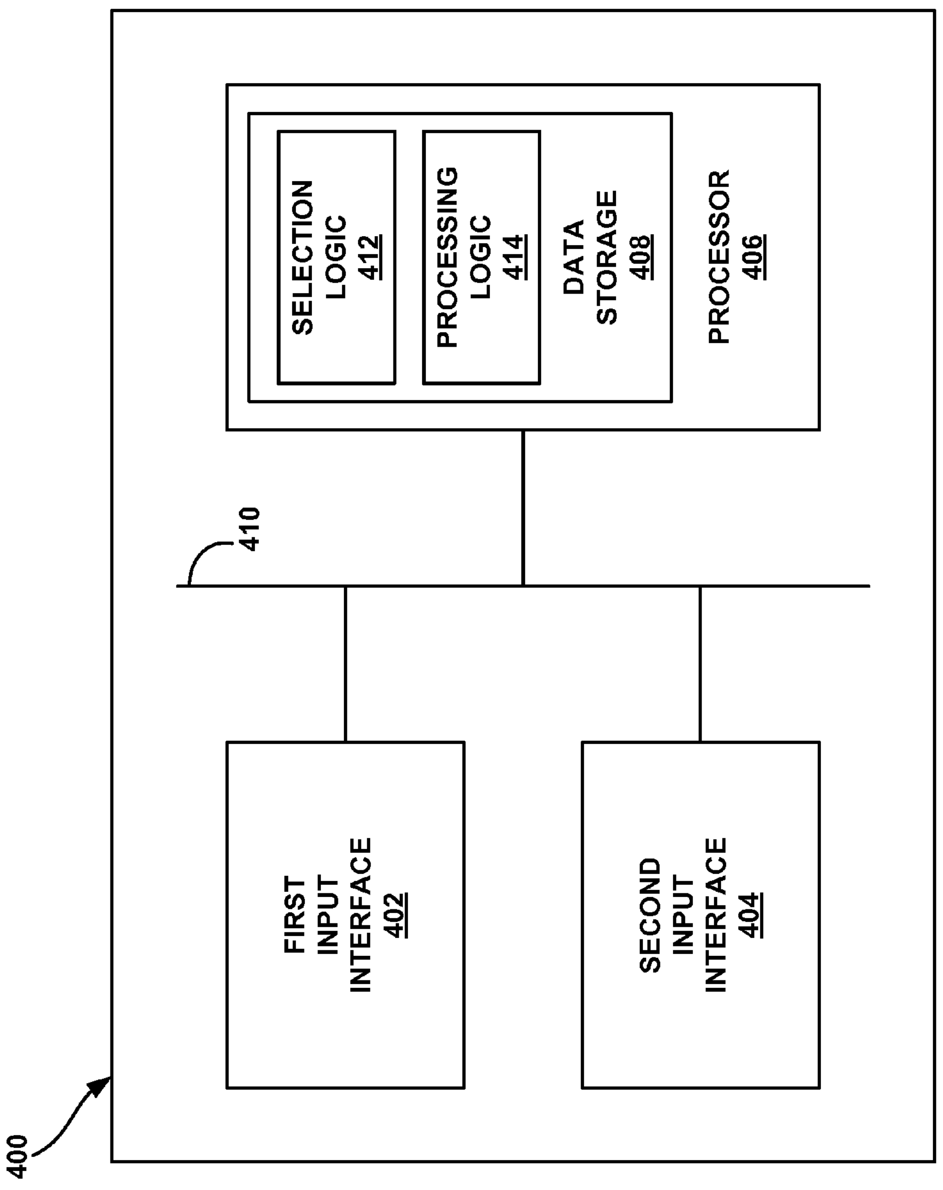
FIG. 4 shows a block diagram of an example server, in accordance with an embodiment.

FIG. 4 shows a block diagram of an example server, in accordance with an embodiment. As shown, the server 400 includes a first input interface 402, a second input interface 404, a processor 406, and data storage 408, all of which may be communicatively linked together by a system bus, network, and/or other connection mechanism 410.

The first input interface 402 may be any interface configured to receive from a client device a request for audio at a requested location. To this end, the first input interface 402 may be, for example, a wireless interface, such as any of the wireless interfaces described above. Alternately or additionally, the first input interface 402 may be a web-based interface accessible by a user using the client device. The first input interface 402 may take other forms as well.

The second input interface 404 may be any interface configured to receive from the head-mounted devices data representing audio recorded by an audio sensor included in each of the head-mounted devices. To this end, the second input interface 404 may be, for example, a wireless interface, such as any of the wireless interfaces described above. The second input interface 404 may take other forms as well. In some embodiments, the second input interface 404 may additionally be configured to receive data representing current locations of the head-mounted devices, either from the head-mounted devices themselves or from another entity, as described above. In some embodiments, the second input interface 404 may additionally be configured to receive data representing one or more parameters of the head-mounted devices and/or the audio sensors, as described above. In some embodiments, the second input interface 404 may additionally be configured to receive data representing information sensed by one or more sensors on the head-mounted devices, as described above.

The processor 406 may comprise one or more general-purpose processors and/or one or more special-purpose processors. To the extent the processor 406 includes more than one processor, such processors could work separately or in combination. Further, the processor 406 may be integrated in whole or in part with the first input interface 402, the second input interface 404, and/or with other components.

Data storage 408, in turn, may comprise one or more volatile and/or one or more non-volatile storage components, such as optical, magnetic, and/or organic storage, and data storage 408 may be integrated in whole or in part with the processor 406. Further, data storage 408 may contain the data received from the head-mounted devices representing audio sensed by audio sensors at each of the head-mounted devices. Additionally, data storage 408 may contain program logic executable by the processor 408 to carry out various server functions. As shown, data storage 408 includes selection logic 412 and processing logic 414.

Selection logic 412 may be executable by the processor 406 to determine a location of a plurality of audio sensors. Determining the location of the plurality of audio sensors may involve, for example, determining a location of the head-mounted devices to which the audio sensors are coupled. The selection logic may be further executable by the processor 406 to store the determined locations in data storage 408. In some embodiments, the selection logic may be further executable by the processor 406 to associate the received data representing audio with the determined locations of the audio sensor, thereby creating a location-based record of the audio recorded by the audio sensor coupled to each head-mounted device. An example of such a location-based record is shown in FIG. 5*a*.

FIG. 5*a* shows an example location-based record of audio recorded at an audio sensor, in accordance with an embodiment. As shown in FIG. 5*a*, the location-based record 500 includes an identification 502 of the audio sensor (or the head-mounted device to which the audio sensor is coupled). Further, the location-based record 500 includes a first column 504 that includes data representing audio sensed by the identified audio sensor and a second column 506 that includes data representing locations of the identified audio sensor. As shown, each datum representing audio (in the first column 504) is associated with a datum representing a location where the identified audio sensor was located when the audio was sensed (in the second column 506).

In some embodiments, the data representing the sensed audio may include pointers to a location in data storage 408 (or other data storage accessible by the server 400) where the sensed audio is stored. The sensed audio may be stored in any known file format, such as a compressed audio file format (e.g., MP3 or WMA) or an uncompressed audio file format (e.g., WAV). Other file formats are possible as well.

In some embodiments, the data representing the locations may take the form of coordinates indicating a location in real space, such as latitude and longitude coordinates and/or altitude. Alternately or additionally, the data representing the locations may take the form of coordinates indicating a location in a virtual space representing real space. The data representing the current locations may take other forms as well.

Returning to FIG. 4, the selection logic may, in some embodiments, be further executable by the processor 406 to associate the received data representing audio and the determined locations of the audio sensor with data representing times at which the audio was sensed by the audio sensor, thereby creating a location-and-time-based record of the audio recorded by the audio sensor coupled to each head-mounted device. An example of such a location-based record is shown in FIG. 5*b*.

FIG. 5*b* shows an example location-and-time-based record of audio recorded at an audio sensor, in accordance with an embodiment. As shown in FIG. 5*b*, the location-and-time-based record 508 is similar to the location-based record 500, with the exception that the location-and-time-based record 508 additionally includes a third column 510 that includes data representing times at which the audio was sensed by the audio sensor. As shown, each datum representing audio is associated with both a datum representing a location where the identified audio sensor was located when the audio was sensed as well as a datum representing a time at which the audio was sensed (in the third column 510).

In some embodiments, the data representing the times may indicate an absolute time, such as a date (day, month, and year) as well as a time (hour, minute, second, etc.). In other embodiments, the data representing the times may indicate a relative time, such as times relative to the time at which the first datum of audio was sensed. The data representing the times may take other forms as well.

Returning to FIG. 4, the selection logic may be further executable by the processor 406 to determine, based on the requested location and the location of the plurality of audio sensors, an ad hoc array of audio sensors. For example, the selection logic may be executable by the processor 406 to determine from the location-based record of each audio sensor which audio sensors are located closest to the requested location and to select for the ad hoc array audio sensors that are located closest to the requested location. In some embodiments, the request from the client device may additionally include a time. In these embodiments, the selection logic may be further executable by the processor 406 to determine from the location-and-time-based record of each audio sensor where each audio sensors was located at the requested time, and to select for the ad hoc array audio sensors that were located closest to the requested location at the requested time. Other examples are possible as well.

Processing logic 414 may be executable by the processor 406 to process the audio sensed by audio sensors in the ad hoc array to produce an output substantially estimating audio at the requested location. To this end, processing logic 414 may be executable by the processor 406 to process the audio sensed by the audio sensors in the ad hoc array by, for example, processing the audio based on the location of each of the audio sensors in the ad hoc array and/or using a beam-forming process. In some embodiments, processing logic 414 may be executable by the processor 406 to process the audio sensed by the audio sensors in the ad hoc array based on data received from the head-mounted devices representing one or more parameters of the head-mounted devices and/or the audio sensors and/or information sensed by one or more sensors on the head-mounted devices. Other examples are possible as well.

Data storage 408 may include additional program logic as well. For example, data storage 408 may include program logic executable by the processor 406 to transmit the output to the client device. As still another example, data storage 408 may, in some embodiments, contain program logic executable by the processor 406 to generate and transmit to the head-mounted devices instructions for controlling a direction of the audio sensors on the head-mounted devices. Other examples are possible as well.

5. Example Method and Application

Figure 6A:
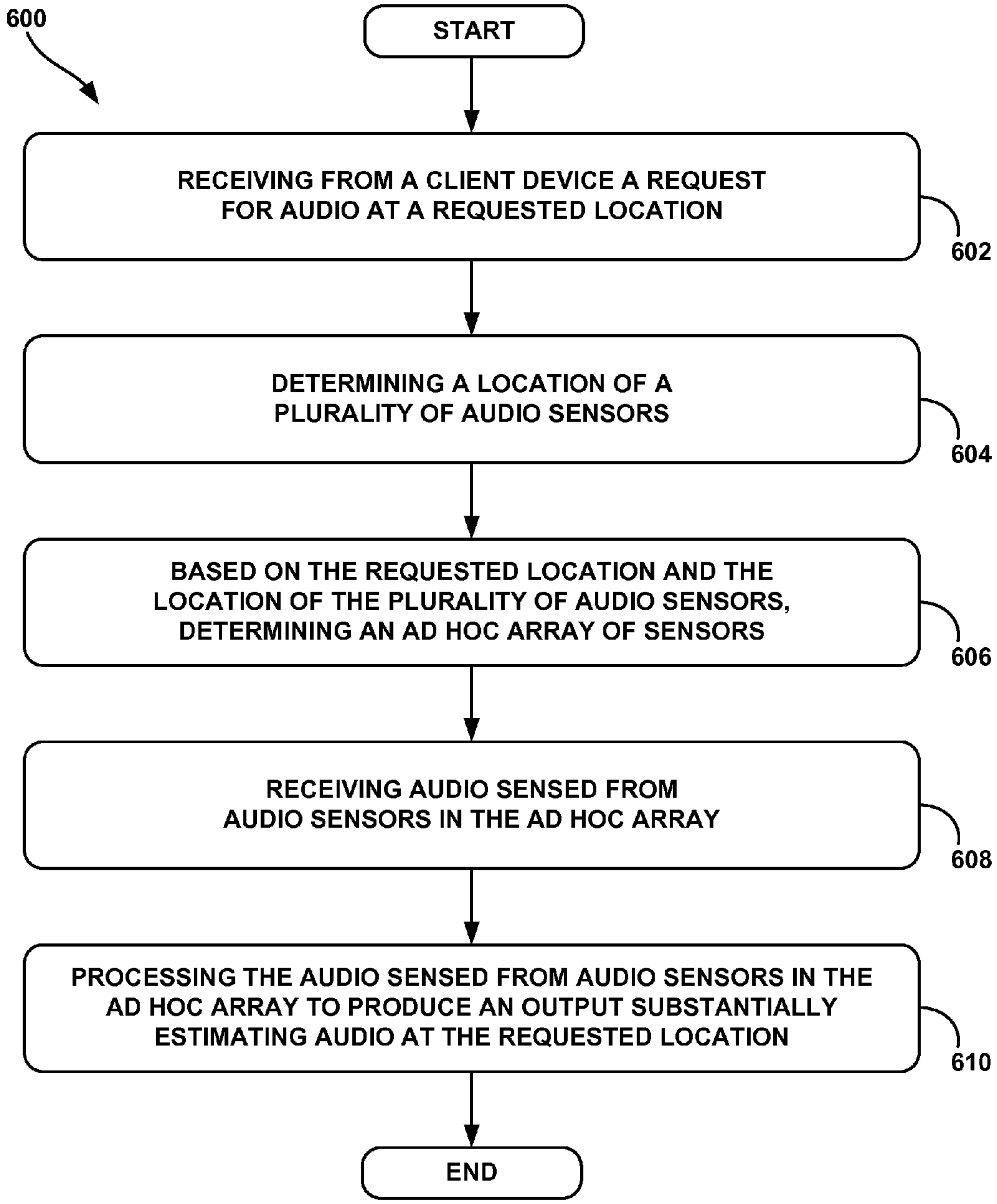
FIGS. 6*a-b* show flow charts of an example method for estimating audio at a requested location (FIG. 6*a*) and an example method for determining an ad hoc array (FIG. 6*b*), in accordance with an embodiment.
Figure 6B:
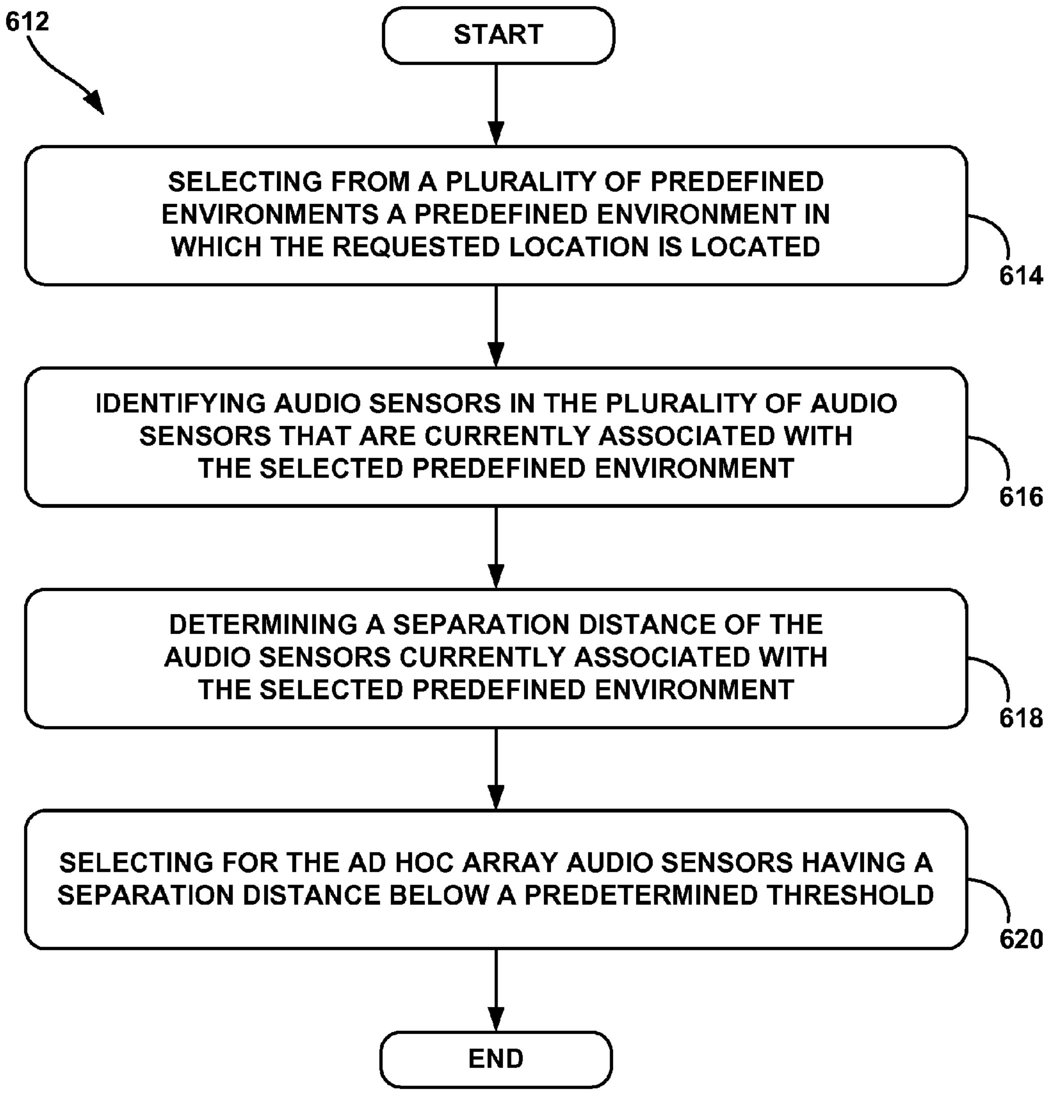

FIGS. 6*a*-*b* show flow charts of an example method for estimating audio at a requested location (FIG. 6*a*) and an example method for determining an ad hoc array (FIG. 6*b*), in accordance with an embodiment.

Method 600 shown in FIG. 6*a* presents an embodiment of a method that, for example, could be used with systems, devices, and servers described herein. Method 600 may include one or more operations, functions, or actions as illustrated by one or more of blocks 602-610. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 600 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 600 and other processes and methods disclosed herein, each block may represent circuitry that is wired to perform the specific logical functions in the process.

As shown, the method 600 begins at block 602 where a server receives from a client device a request for audio at a requested location. The server may receive the request in several ways. In some embodiments, the server may receive the request via, for example, a web-based interface accessible by a user of the client device. For example, a user of the client device may access the web-based interface by entering a website address into a web browser and/or running an application on the client device. In other embodiments, the server may receive from the client device information indicating a gaze of a user of the client device (e.g., a direction in which the user is looking and/or a location or object at which the user is looking) The server may then determine the requested location based on the gaze. In still other embodiments, the server may receive from a plurality of client devices (including the client device from which the request was received) information indicating a gaze of a user of each of the plurality of client devices. The server may then determine a collective gaze of the plurality of client devices based on the gaze of each user. The collective gaze may indicate, for example, a direction in which a majority (or the largest number) of users is looking, or a location or object at which a majority (or the largest number) of users is looking In some cases, the gaze of the client device from which the request is received may be weighed more heavily than the gazes of other client devices in the plurality of client devices. In any case, the server may determine the requested location based on the collective gaze.

The request may include an indication of the requested location. The indication of the requested location may take the form of, for example, a set of coordinates identifying the requested location. The set of coordinates may indicate a position in real space, such as a latitude and longitude and/or altitude of the requested location. Alternately or additionally, the coordinates may indicate a position in a virtual space representing a real space. The virtual space may be known (and/or in some cases provided by) the server, such that the server may be able to determine a position in real space using the coordinates indicating the position in the virtual space. The indication of the requested location may take other forms as well. In some embodiments, the request may additionally include an indication of a requested direction from which the audio is to be sensed. The indication of the requested direction may take the form of, for example, a cardinal direction (e.g., north, southwest), an orientation (e.g., up, down), and/or a direction and/or orientation relative to a known location or object. In embodiments whether the requested direction includes an orientation, the orientation may be similarly determined by the server based on a gaze of the client device and/or a plurality of client devices, as described above. In some embodiments, the request may additionally include an indication of a requested time requested by a user of the client device. The indication of the requested time may specify a single time or a period of time.

The method 600 continues at block 604 where the server determines a location of a plurality of audio sensors. The audio sensors may be coupled to head-mounted devices, such as the head-mounted devices described above. Accordingly, in order to determine a location of the audio sensors, the server may determine a location of the head-mounted devices to which the audio sensors are coupled.

The location of each audio sensors may be an absolute location, such as a latitude and longitude, or may be a relative location, such as a distance and a cardinal direction from, for example, a known location. In some embodiments, the current location of an audio sensor may be relative to a current location of another audio sensor, such as an audio sensor of which an absolute current location is known. In other embodiments, the location of each audio sensor may be an approximate location, such as a cell or sector in which each audio sensor is located, or an indication of a nearby landmark or building. The location of each audio sensor may take other forms as well.

The server may determine the location of the plurality of audio sensors in several ways. In one example, the server may receive data representing the current locations of the audio sensors from some or all of the audio sensors (via the head-mounted devices). The data representing the current locations may take several forms. For instance, the data representing the current locations may be data representing absolute locations of the audio sensors as determined through, for example, a GPS receiver. Alternately, the data representing the current locations may be data representing a location of the audio sensors relative to another audio sensor or a known location or object as determined through, for example, time-stamped detection of an emitted sound, simultaneous localization and mapping (SLAM), and/or information sensed by one or more sensors on the head-mounted devices. Still alternately, the data representing the current locations may be data representing information useful in estimating the current locations as determined in any of the manners described above.

In some cases one or more head-mounted devices may provide data representing an absolute current location for itself as well as current locations of one or more other head-mounted devices. The current locations for the one or more other head-mounted devices may be absolute, relative to the current location of the head-mounted device, or relative to a known location or object.

The server may receive the data continuously, periodically, as requested by the server, or in response to another trigger. In another example, the server may be configured to (or may query a separate entity configured to) maintain current location information for each of the audio sensors using one or more standard location-tracking techniques (e.g., triangulation, trilateration, multilateration, WiFi beaconing, magnetic beaconing, etc.). The server may determine a current location of each audio sensor in other ways as well.

The method 600 continues at block 606 where the server determines, based on the requested location and the location of the plurality of audio sensors, an ad hoc array of audio sensors. The server may determine the ad hoc array in several ways. An example way in which the server may determine the ad hoc array is described below in connection with FIG. 6*b*.

The method 600 continues at block 608 where the server receives audio sensed from audio sensors in the ad hoc array. The server receiving the audio from the audio sensors in the ad hoc array may take many forms.

In some embodiments, the server receiving the audio from the audio sensors in the ad hoc array may involve the server sending, in response to determining the ad hoc array, a request for sensed audio to one or more audio sensors in the ad hoc array. The audio sensors may then, in response to receiving the request, transmit sensed audio to the server.

In other embodiments, the server may receive audio sensed by one or more audio sensors (not just those in the ad hoc array) periodically or continuously. Upon receiving sensed audio from an audio sensor, the server may store the sensed audio in data storage, such as in a location-based or location-and-time-based record, as described above. In these embodiments, the server receiving the audio from the audio sensors in the ad hoc array may involve the server selecting, from the stored sensed audio, audio sensed by the audio sensors in the ad hoc array. Further, in embodiments where the request from the client device includes a requested time, the server receiving the audio from the audio sensors in the ad hoc array may further involve the server selecting, from the stored sensed audio, audio sensed by the audio sensors in the ad hoc array at the requested time. The server may receive audio sensed by the audio sensors in the ad hoc array in other manners as well.

In some embodiments, after determining the ad hoc array, the server may periodically determine an updated location of each audio sensor in the ad hoc array in any of the manners described above.

The method 600 continues at block 610 where the server processes the audio sensed from audio sensors in the ad hoc array to produce an output substantially estimating audio at the requested location. The server processing the audio sensed from audio sensors in the ad hoc array may take many forms.

In some embodiments, the server processing the audio sensed from audio sensors in the ad hoc array may involve the server processing the audio sensed from audio sensors in the ad hoc array based on the location of each audio sensor in the ad hoc array. Such processing may take several forms, a few examples of which are described below. It will be apparent, however, to a person of ordinary skill in the art that such processing could be performed using one or more known audio processing techniques instead of or in addition to those described below.

In one example, the server may, for each audio sensor in the ad hoc array, delay audio sensed by the audio sensor based on the separation distance of the audio sensor to produce a delayed audio signal and may combine the delayed audio signals from each of the audio sensors in the ad hoc array by, for example, summing the delayed audio signals. For instance, in an array of k audio sensors ($a_1, a_2, \ldots, a_k$) each having a separation distance d ($d_1, d_2, \ldots, d_k$) from a requested location R, a time delay t may be calculated for each audio sensor $a_i$ using equation (1):

$$t_i/d_i/v_i \quad (1)$$

where v is the speed of sound, typically 343 m/s. It is to be understood, of course, the v may vary depending on one or more parameters at the current location of each audio sensor and/or the requested location including, for example, pressure and/or temperature. In some embodiments, v may be determined by, for example, using an emitting device (e.g., a separate device, a head-mounted device in the array, and/or a sound-producing object present in the environment) to emit a sound (e.g., a sharp impulse, a swept sine wave, a pseudorandom noise sequence, etc.), and recording at each head-mounted device a time when the sound is detected by the audio sensor at each head-mounted device. If the locations of the head-mounted devices are known, a distance between the head-mounted devices and the recorded times may be used to generate an estimate of v for each audio sensor and/or for the array. In other embodiments, v may be determined based on the temperature and/or pressure at each head-mounted device. v may be estimated in other ways as well.

Each audio sensor may sense an audio signal s(t). However, because the audio sensors may have varying separation distances, the audio sensors may sense and generate signals $x_i(t)$. Each signal $x_i(t)$ may be a time-delayed version of the audio signal s(t), as shown in equation (2):

$$x_i(t)=s(t-\tau_i \quad (2)$$

where τ is the time delay.

Before combining the signals $x_i(t)$, the signals $x_i(t)$ must be aligned in time by accounting for the time delay in each signal. To this end, time-shifted versions of the signals $x_i(t)$ may be generated, as shown in equation (3):

$$x_i(t+\tau_i)=s(t) \quad (3)$$

The time-shifted signals $x_i(t+\tau_i)$ may then be combined to generate an estimate y substantially estimating audio at the requested location using, for example, equation (4):

$$y(t)=\Sigma w_i x_i(t+\tau_i) \quad (4)$$

which can be seen to be equal to:

$$y(t)=\Sigma w_i s(t) \quad (5)$$

In equations (4) and (5), w is a weighting factor for each audio sensor. In some embodiments, w may simply be 1/k. In other embodiments, w may be determined based on the separation distance of each audio sensor (e.g., audio sensors closer to the requested location may be weighted more heavily). In yet other embodiments, w may be determined based on the temperature and/or pressure at the requested location and/or the location of each audio sensor. In still other embodiments, w may take into account any known or identified reflections and/or echoes. In still other embodiments, w may take into account the signal quality of the audio sensed at each audio sensor. In some embodiments, the estimate y may be generated in the time domain. In other embodiments, the estimate y may be generated in the frequency domain. One or more types of filtering may additionally be performed in the frequency domain.

In some embodiments, the server may remove one or more delayed audio signals $x_i(t+\tau_i)$ before summing by, for example, setting w to zero. In some embodiments, the server may determine a dominant type of audio in the delayed audio signals, such as speech or music, and may remove delayed audio signals in which the determined type of audio type is not dominant.

In some embodiments, one or more types of noise may be present in the signals $x_i(t)$, such that $x_i(t)$ is given by:

$$x_i(t)=s(t-\tau_i)+n_i(t) \quad (6)$$

where n is the noise. One or more types of filtering, such as adaptive beamforming, null-forming, and/or filtering in the frequency domain, may be used to account for the noise n.

In another example, the server processing the audio sensed from audio sensors in the ad hoc array may involve the server using a beamforming process, in which the audio sensed from the audio sensors located in a certain direction from the requested location is emphasized (e.g., by increasing the signal to noise ratio) through constructive interference and audio from audio sensors located in another direction from the requested location is de-emphasized through destructive interference. The server may process the audio in other ways as well.

In some embodiments, after processing the audio sensed from audio sensors in the ad hoc array to produce the output substantially estimating audio at the requested location, the server may provide the output to the client device. The output may be provided to the client device as, for example, an audio file, or may be streamed to the client device. Other examples are possible as well.

As noted above, FIG. 6*b* shows an example method for determining an ad hoc array, in accordance with an embodiment. The method 612 may, in some embodiments, be substituted for block 606 in FIG. 6*a*.

As shown, the method 612 begins at block 614 where a server selects from a plurality of predefined environments a predefined environment in which a requested location received from a client device is located. The predefined environments may be any delineated physical area. As one example, some predefined environments may be geographic cells or sectors, such as those defined by entities in a wireless network. As another example, some predefined environments may be landmarks or buildings, such as a stadium or concert venue. Other types of predefined environments are possible as well.

In some embodiments, the predefined environments may not be mutually exclusive; that is, some predefined embodiments may overlap with others, and further some predefined environments may be contained entirely within another predefined environment. When a requested location is found to be located in more than one predefined environment, the server may, in some embodiments, select the predefined environment having the smallest geographic area. In other embodiments, when a requested location is found to be located in more than one predefined environment, the server may select the predefined environment having a geographic center located closest to the requested location. In still other embodiments, when a requested location is found to be located in more than one predefined environment, the server may select the predefined environment having the highest number and/or highest density of audio sensors. The server may select between predefined environments in other manners as well.

The method 612 continues at block 616 where the server identifies audio sensors in the plurality of audio sensors that are currently associated with the selected predefined environment. An audio sensor may become associated with a predefined environment in several ways. For example, an audio sensor may become associated with a predefined environment in response to user input indicating that the audio sensor is located in the predefined environment. Alternately or additionally, the audio sensor may become associated with a predefined environment in response to detection (e.g., by the head-mounted device to which the audio sensor is coupled, by the server, or by another entity) that the audio sensor is located within the predefined environment. Still alternately or additionally, the audio sensor may become associated with a predefined environment in response to detection (e.g., by the head-mounted device to which the audio sensor is coupled) of a signal emitted by a network entity in the predefined environment. Still alternately or additionally, the audio sensor may become associated with a predefined environment in response to connecting to a particular wireless network (e.g., a particular WiFi network) or wireless network entity (e.g., a particular base station in a wireless network). The audio sensor may become associated with a predefined environment in other ways as well. In embodiments where predefined environments are not mutually exclusive, an audio sensor may be associated with more than one predefined environment at once.

The method 612 continues at block 618 where the server determines a separation of the audio sensors currently associated with the selected predefined environment. The separation distance of an audio sensor may be a distance between the location of the audio sensor and the requested location. In order to determine a separation distance for an audio sensor, the server may, in some embodiments, consult a location-based and/or location-and-time-based record for the audio sensor (such as the location-based and location-and-time-based records described above in connection with FIGS. 5*a-b*) in order to determine the location of the audio sensor. The server may then determine the separation distance for the audio sensor by determining a distance between the location of the audio sensor and the requested location. In embodiments where the request from the client device includes a requested time, in order to determine a separation distance for an audio sensor the server may consult a location-and-time-based record for the audio sensor in order to determine the location of the audio sensor at the requested time. The server may then determine the separation distance for the audio sensor by determining a distance between the location of the audio sensor at the requested time and the requested location. The server may determine the separation distance of each audio sensor in other ways as well, such as by querying one or more other entities with the requested location (and, in some embodiments, time).

The method 612 continues at block 620 where the server selects for the ad hoc array audio sensors having a separation distance below a predetermined threshold. The predetermined threshold may be predetermined based on, for example, a density of audio sensors in the predefined environment, a distance sensitivity of the audio sensors, and a dominant type of audio at the requested location (e.g., speech, music, white noise, etc.). The predetermined threshold may be predetermined based on other factors as well.

In some cases, there may be no audio sensors having a separation distance less than the predetermined threshold. In these cases, the server may, for example, increase the predetermined threshold and/or provide an error message to the client device. Other examples are possible as well.

The server may select the ad hoc array by performing the functions described in some or all of the blocks 614-620 of the method 612. The server may select the ad hoc array in other manners as well.

In some embodiments, upon determining the ad hoc array, the server may further determine for audio sensors in the ad hoc array whether sensed audio may be received from the audio sensor based on permissions set for the audio sensor. In one example, a user of the audio sensor may set a permission indicating that audio sensed by the audio sensor cannot be sent to the server. In another example, a user of the audio sensor may set a permission indicating that audio sensed by the audio sensor can be sent to the server only in response to user approval. In still another example, a user of the audio sensor may set a permission indicating that audio sensed by the audio sensor can be sent to the server during certain time periods or when the audio sensor is located in certain locations. Other examples of permissions are possible as well.

Figure 7A:
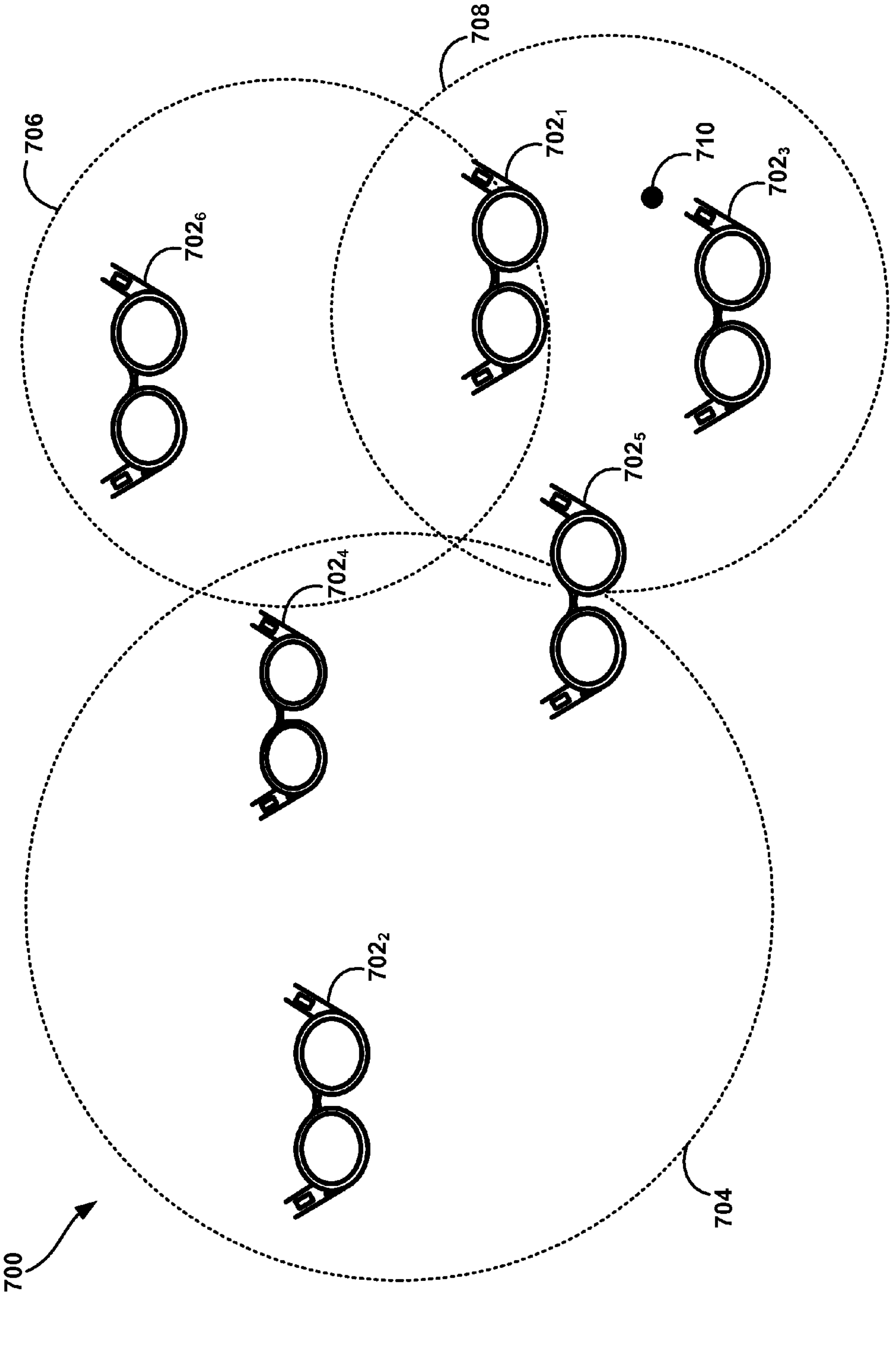
FIGS. 7*a-b* show example applications of the methods shown in FIGS. 6*a-b*, in accordance with an embodiment.
Figure 7B:
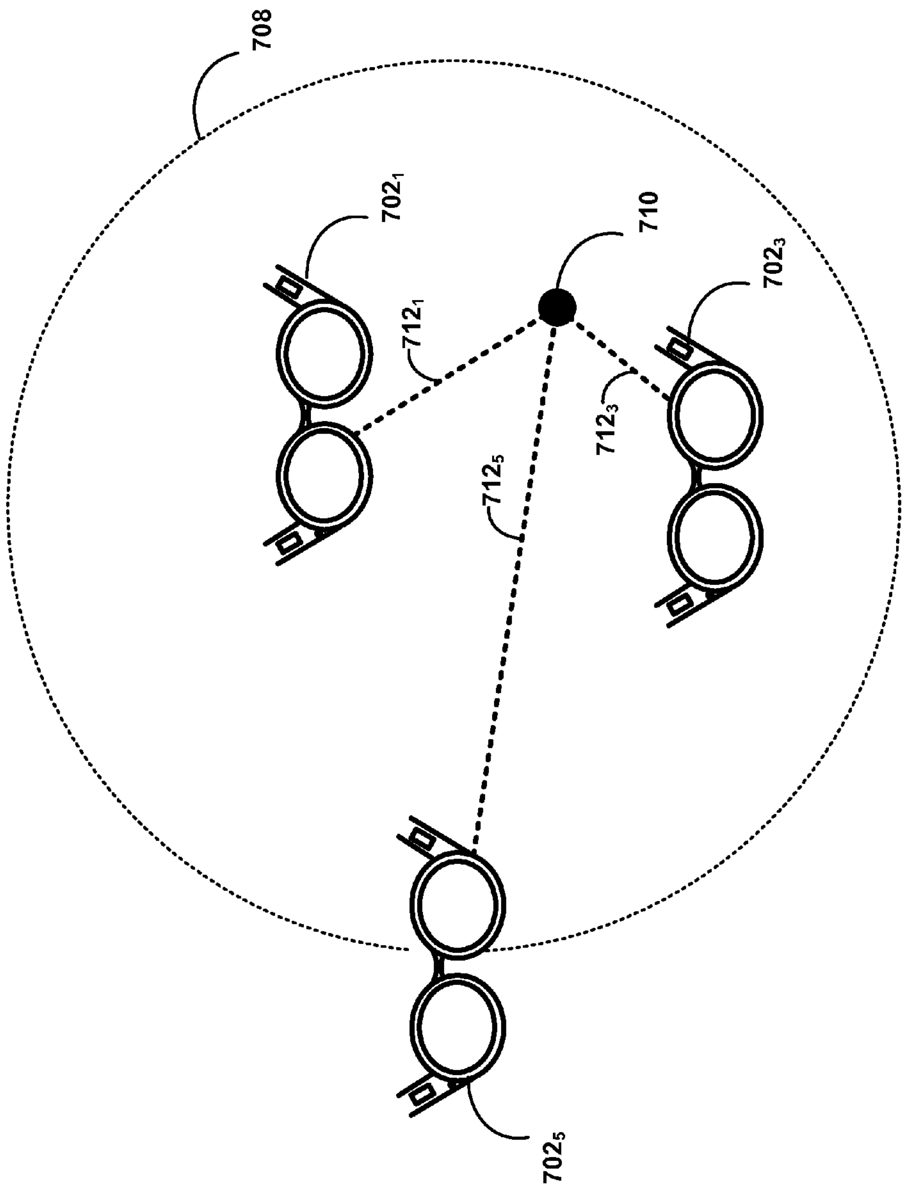

FIGS. 7*a-b* show example applications of the methods shown in FIGS. 6*a-b*, in accordance with an embodiment. In the example application 700 shown in FIG. 7*a*, a plurality of audio sensors 702 (on head-mounted devices) are located in one or more of predefined environments 704, 706, and 708.

In the example application 700, a server may receive from a client device a request for audio at a requested location 710. Additionally, the server may determine a location of each of the audio sensors 702. Upon receiving the requested location 710, the server may select from the predefined environments 704, 706, and 708 a predefined environment in which the requested location 710 is located, namely predefined environment 708. A detailed view of predefined environment 708 is shown in FIG. 7*b*.

Based on the requested location 710 and the locations of the audio sensors 702, the server may determine an ad hoc array of sensors. To this end, the server may identify among the audio sensors 702 audio sensors that are currently associated with the selected predefined environment. As shown in FIG. 7*b*, audio sensor $\mathbf{702}_1$, audio sensor $\mathbf{702}_3$, and audio sensor $\mathbf{702}_5$ are currently associated with the selected predefined environment. Then, the server may determine a separation distance for each of the audio sensors currently associated with the selected predefined environment, namely audio sensor $\mathbf{702}_1$, audio sensor $\mathbf{702}_3$, and audio sensor $\mathbf{702}_5$. As shown, audio sensor $\mathbf{702}_1$ has a separation distance $\mathbf{712}_1$, audio sensor $\mathbf{702}_3$ has a separation distance $\mathbf{712}_3$, and audio sensor $\mathbf{702}_5$ has a separation distance $\mathbf{712}_5$. The server may select for the ad hoc array audio sensors having a separation distance below a predetermined threshold. In one example, predetermined threshold may be greater than separation distance $\mathbf{712}_1$ and separation distance $\mathbf{712}_3$ but may be less than separation distance $\mathbf{712}_5$. In this example, the server may select for the ad hoc array audio sensor $\mathbf{702}_1$ and audio sensor $\mathbf{702}_3$ but not audio sensor $\mathbf{702}_5$. Other examples are possible as well.

Once the server has selected the ad hoc array, the server may receive audio sensed from the audio sensors in the ad hoc array. Further, the server may process the audio sensed from the audio sensors in the ad hoc array to produce an output substantially estimating audio at the requested location 710. The server may then transmit the output to the client device.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method, comprising:
- receiving from a client device a request for audio at a requested location;
- determining a location of a plurality of audio sensors, wherein the plurality of audio sensors are coupled to head-mounted devices in which a location of each of the plurality of audio sensors varies;
- based on the requested location and the location of the plurality of audio sensors, determining an ad hoc array of audio sensors, wherein determining the ad hoc array comprises:
  - selecting from a plurality of predefined environments a predefined environment in which the requested location is located;
  - identifying audio sensors in the plurality of audio sensors that are currently associated with the selected predefined environment;
  - determining a separation distance of the audio sensors currently associated with the selected predefined environment, wherein the separation distance for an audio sensor comprises a distance between the location of the audio sensor and the requested location; and
  - selecting for the ad hoc array audio sensors having a separation distance below a predetermined threshold;
- receiving audio sensed from audio sensors in the ad hoc array; and
- processing the audio sensed from audio sensors in the ad hoc array to produce an output substantially estimating audio at the requested location.

2. The method of claim 1, wherein receiving the request comprises receiving a set of coordinates identifying the requested location.

3. The method of claim 1, wherein determining the location of an audio sensor comprises at least one of querying the audio sensor for the location and receiving the location from the audio sensor.

4. The method of claim 1, wherein the location of an audio sensor comprises a location of the audio sensor relative to a known location.

5. The method of claim 1, wherein processing the audio sensed from audio sensors in the ad hoc array comprises processing the audio based on the location of each audio sensor in the ad hoc array.

6. The method of claim 5, wherein processing the audio based on the location of each audio sensor in the ad hoc array comprises:

for each audio sensor in the ad hoc array, delaying audio sensed by the audio sensor based on the separation distance of the audio sensor to produce a delayed audio signal; and combining the delayed audio signals from each of the audio sensors in the ad hoc array.

7. The method of claim 1, wherein processing the audio sensed from audio sensors in the ad hoc array comprises using a beamforming process.

8. The method of claim 1, further comprising:

determining for audio sensors in the ad hoc array whether sensed audio may be received based on permissions set for the audio sensor.

9. The method of claim 1, further comprising:

receiving audio sensed by each audio sensor of the plurality of audio sensors; and storing in memory the sensed audio, a corresponding location of the audio sensor where the audio was sensed, and a corresponding time at which the audio was sensed.

10. The method of claim 9, wherein the request further includes a time at which the audio at the requested location was sensed.

11. The method of claim 1, further comprising periodically determining an updated location of each audio sensor in the ad hoc array.

12. A server, comprising:

a first input interface configured to receive from a client device a request for audio at a requested location;

a second input interface configured to receive audio from audio sensors;

at least one processor; and data storage comprising selection logic and processing logic, wherein the selection logic is executable by the at least one processor to:

determine a location of a plurality of audio sensors, wherein the plurality of audio sensors are coupled to head-mounted devices in which a location of each of the plurality of audio sensors varies;

based on the requested location and the location of the plurality of audio sensors, determine an ad hoc array of audio sensors, wherein determining the ad hoc array comprises:

selecting from a plurality of predefined environments a predefined environment in which the requested location is located;

identifying audio sensors in the plurality of audio sensors that are currently associated with the selected predefined environment;

determining a separation distance of the audio sensors currently associated with the selected predefined environment, wherein the separation distance for an audio sensor comprises a distance between the location of the audio sensor and the requested location; and selecting for the ad hoc array audio sensors having a separation distance below a predetermined threshold, wherein the processing logic is executable by the at least one processor to process the audio sensed from audio sensors in the ad hoc array to produce an output substantially estimating audio at the requested location.

13. The server of claim 12, wherein one or both of the first input interface and the second input interface is a wireless interface.

14. The server of claim 12, wherein the processing logic is further executable to process the audio based on the location of each audio sensor in the ad hoc array.

15. The server of claim 12, wherein the processing logic is further executable to request a given audio sensor in the ad hoc array to provide audio sensed from the audio sensor.

16. The server of claim 12, wherein the processing logic is further executable to:

receive audio sensed by each audio sensor of the plurality of audio sensors; and store in the data storage the sensed audio, a corresponding location of the audio sensor where the audio was sensed, and a corresponding time at which the audio was sensed.

17. The server of claim 12, wherein the processing logic is further executable to periodically determine an updated location of each audio sensor in the ad hoc array.

18. The server of claim 12, wherein the server is configured to provide an instruction to control a direction of audio sensors in the ad hoc array.

19. The server of claim 12, further comprising an output interface configured to provide the output to the client device.

20. A non-transitory computer readable medium having stored therein instructions executable by a computing device to cause the computing device to perform the functions of:

receiving from a client device a request for audio at a requested location;

determining a location of a plurality of audio sensors, wherein the plurality of audio sensors are coupled to head-mounted devices in which a location of each of the plurality of audio sensors varies;

based on the requested location and the location of the plurality of audio sensors, determining an ad hoc array of audio sensors, wherein determining the ad hoc array comprises:

selecting from a plurality of predefined environments a predefined environment in which the requested location is located;

identifying audio sensors in the plurality of audio sensors that are currently associated with the selected predefined environment;

determining a separation distance of the audio sensors currently associated with the selected predefined environment, wherein the separation distance for an audio sensor comprises a distance between the location of the audio sensor and the requested location; and selecting for the ad hoc array audio sensors having a separation distance below a predetermined threshold;

receiving audio sensed from audio sensors in the ad hoc array; and processing the audio sensed from audio sensors in the ad hoc array to produce an output substantially estimating audio at the requested location.

* * * * *